United States Patent [19]
Casali

[11] Patent Number: 6,102,182
[45] Date of Patent: Aug. 15, 2000

[54] CLUTCH CONTROL DEVICE

[75] Inventor: Paolo Casali, Modena, Italy

[73] Assignee: New Holland North America, Inc., New Holland, Pa.

[21] Appl. No.: 09/260,526

[22] Filed: Feb. 26, 1999

[30] Foreign Application Priority Data

Mar. 2, 1998 [IT] Italy .................................. BO98A0121

[51] Int. Cl.$^7$ ........................................................ F16D 25/08

[52] U.S. Cl. ........................................ 192/85 C; 192/99 R

[58] Field of Search ................................ 192/85 R, 85 C, 192/99 R

[56] References Cited

U.S. PATENT DOCUMENTS 3,351,169 11/1967 McIndoe ................................ 192/85 R
4,903,487 2/1990 Leiber ..................................... 60/547.1

Primary Examiner—Richard M. Lorence
Attorney, Agent, or Firm—Larry W. Miller; J. William Stader; Frank A. Seemar

[57] ABSTRACT

A device for controlling a clutch is disclosed wherein a hydraulic cylinder controlling engagement and release of the clutch is supplied with pressurized fluid by a hydraulic circuit along which are provided a supply pump and a tracking valve. The tracking valve has a body and a shutter movable inside the body by means of a control member connected to a mechanical transmission for selectively operating the shutter of the valve.

13 Claims, 5 Drawing Sheets

CLUTCH CONTROL DEVICE

BACKGROUND OF THE INVENTION

The present invention relates to a device for controlling the operation of a clutch. More particularly, the present invention relates to a device for controlling a clutch transmitting torque to a power takeoff (PTO) of a farm vehicle, to which the following description refers purely by way of example.

Farm vehicles normally comprise a power takeoff activated and deactivated by a clutch, which is engaged and released by a control device. One known control device comprises a two-position hand-operated lever, and a mechanical transmission for engaging and releasing the clutch directly. Mechanical control devices of the above type enable the torque transmission to be modulated by the operator for gradual or fast engagement as required.

The transmission of increasingly higher torques through the power takeoff calls for increasingly larger clutches requiring more and more force to operate, whereby mechanical control devices in some instances become inadequate. This has led to the development of hydraulic control devices for engaging and releasing the clutch by means of a hydraulic cylinder, which is supplied with hydraulic fluid under pressure by a pump and controlled selectively by a valve in turn controlled by a normally mechanical control member.

While enabling fairly high power transmission, control devices of the above type involve several drawbacks however by comprising open/closed valves for engaging the clutch with a predetermined torque transmission ramp which cannot be modified by the control member, thus preventing engagement of the clutch from being modulated by the mechanical control member.

SUMMARY OF THE INVENTION

It is an object of the present invention to provide a clutch control device designed to eliminate the aforementioned drawbacks, and which, in particular, provides for modulating engagement of the clutch as required while nevertheless being able to control clutches transmitting fairly high torques.

According to the present invention, there is provided a device for controlling a clutch, comprising a hydraulic cylinder for controlling engagement and release of said clutch; a hydraulic circuit for supplying pressurized fluid to said cylinder and in turn comprising a supply pump and a valve located between said pump and said cylinder; and a control member connected to a mechanical transmission to selectively operate said valve; said device being characterized by said valve being a tracking valve.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
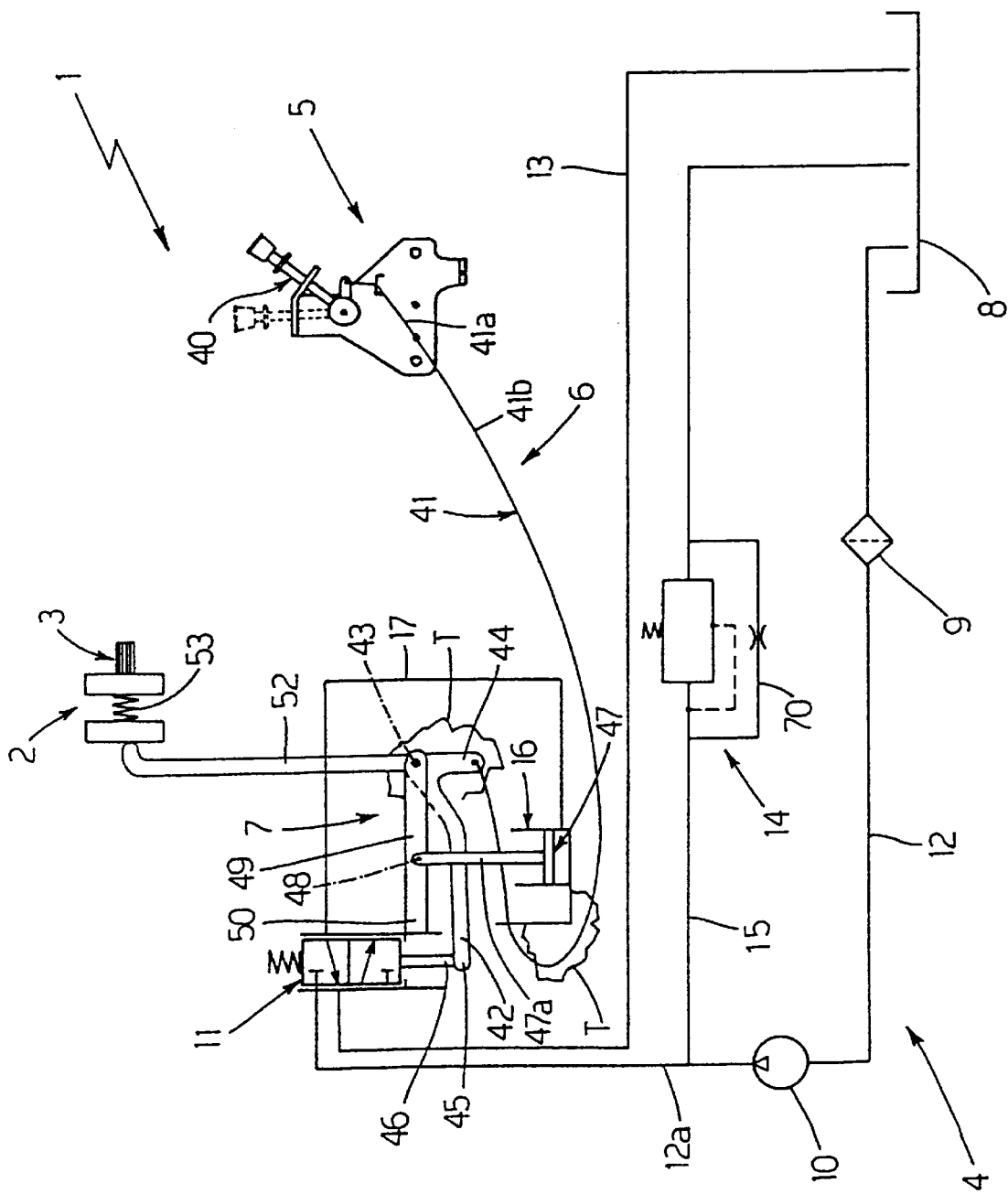
FIG. 1 shows a schematic view of the device according to the invention.

Number 1 in FIG. 1 indicates a device for controlling a clutch 2 transmitting a torque C to a power takeoff 3 of a known farm vehicle (not shown). Device 1 comprises a hydraulic circuit 4, a control member 5, a mechanical transmission 6 located between member 5 and hydraulic circuit 4, and a mechanical transmission 7 located between circuit 4 and clutch 2.

Circuit 4 comprises a tank 8, a filter 9, a pump 10 and a control valve 11, all located in series along a supply branch 12 of circuit 4. Circuit 4 further comprises a return branch 13 connecting valve 11 to tank 8 and a pressure limiting valve 14 located along a branch 15 which is branched from supply branch 12 at a portion 12a extending between pump 10 and valve 11, and connecting portion 12a to tank 8 through valve 14.

Circuit 4 also comprises a single-acting hydraulic cylinder 16 connected to valve 11 by a connecting branch 17.

Figure 2:
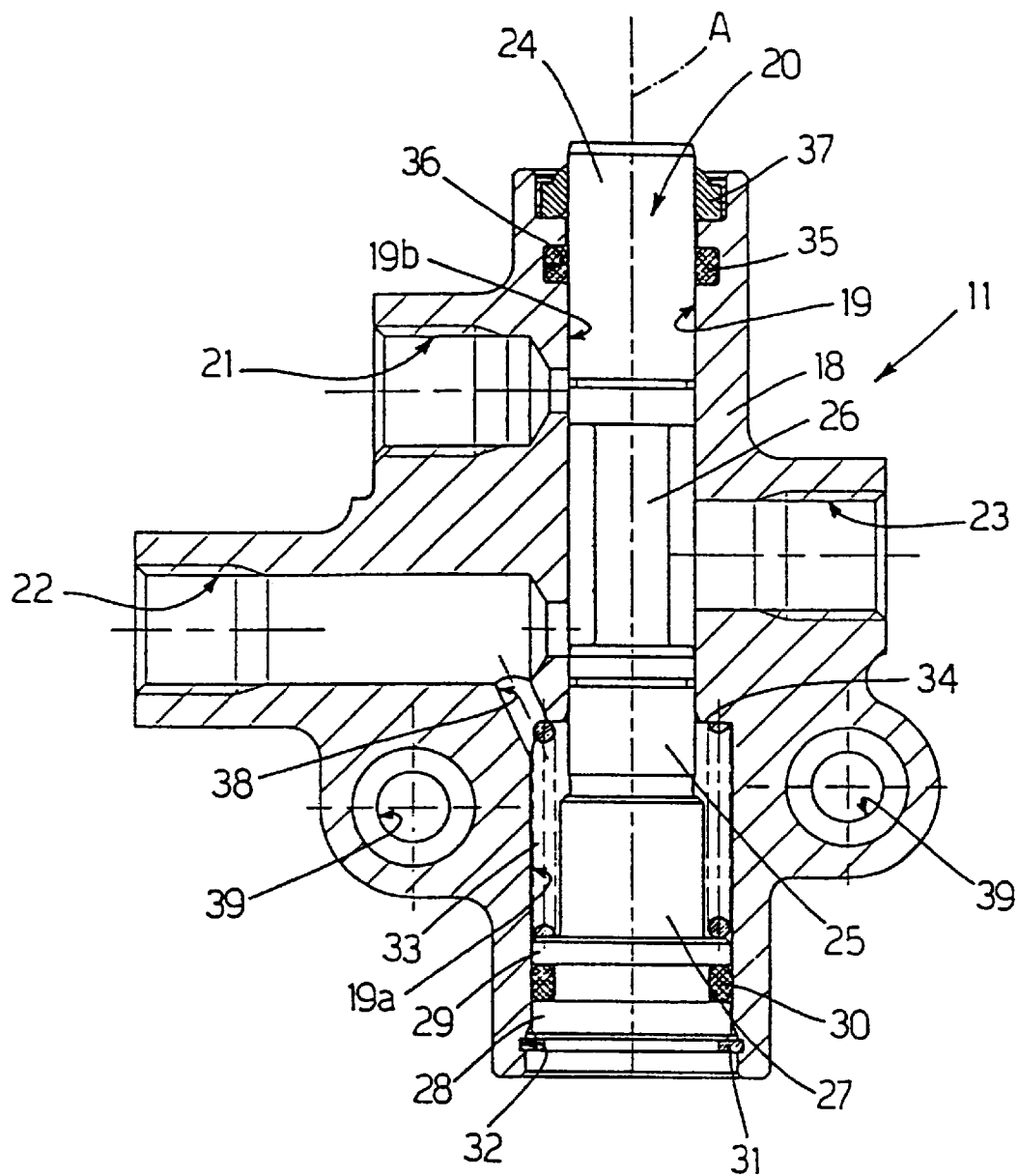
FIG. 2 shows a section of a detail of the device according to the invention.

As shown more clearly in FIG. 2, valve 11 is a three-way slide valve extending along an axis A and comprising a body 18 with a bore 19 extending therethrough in which slides a shutter 20. Bore 19 comprises a portion 19a and a portion 19b smaller in diameter than portion 19a. Bores 21 and 22 for connecting respective supply and return branches 12 and 13 are formed in one side of body 18 at portion 19b whereas a bore 23 for connecting branch 17 is formed in body 18 on the opposite side of and between bores 21 and 22. Shutter 20 substantially comprises a portion 24 for shutting off bore 21, a portion 25 for shutting off bore 22 and a passage portion 26 located between portions 24 and 25 in communication with bore 23. The shutter 20 further comprises a head 27 adjacent to portion 25 and having two shoulders 28 and 29 with a seal 30 in between.

Valve 11 also comprises a lock ring 31 housed in a groove 32 formed on the end of portion 19a; and a coil spring 33, which is coaxial and concentric with head 27, and is located between shoulder 29 of shutter 20 and a shoulder 34 of body 18 defined by the difference in the diameters of portions 19a and 19b. Spring 33 keeps valve 11 in the normally-closed position, i.e. with head 27 contacting ring 31 whereby bore 22 communicates with bore 23 and with bore 21 for connecting the supply branch 12 being closed by portion 24.

Valve 11 furthermore comprises a sealing ring 35 housed in a groove 36 in body 18 at portion 24 and a dust seal 37. Portion 24 isolates portion 19b of bore 19 from portion 19a, the latter communicating with bore 22 for connecting the return branch 13 through a passage 38 formed in body 18. Valve 11 comprises two fastening holes 39 on either side of bore 19, and is a so-called "tracking" valve whereby, as shutter 20 moves a given distance along axis A in opposition to the action of spring 33, body 18 moves the same distance along axis A in the same direction until body 18 is arrested in a given position and shutter 20 is positioned so that bore 21 communicates with bore 23 and the valve is in the so-called open position. In practice, body 18 is movable as a function of the movements determined by cylinder 16.

In the rest condition, valve 11 is set to the closed position, and is moved into the open position by sliding shutter 20 along axis A by means of control member 5 and the associated mechanical transmission 6.

With reference to FIG. 1, control member 5 which will be described in more detail below, comprises a lever 40 movable between a rest position shown by a continuous line, and an engaged position represented by a dashed line. A mechanical transmission 6, also forming part of the control member 5, provides for transmitting movement to the shutter 20. The transmission 6 comprises a Bowden cable 41 having a cable 41*a* enclosed in a sheath 41*b*; and a lever 42, which rotates with respect to a frame T about an axis 43 perpendicular to the plane of FIG. 1. Lever 42 comprises a first end portion 44 which is connected to cable 41*a*, and a second end portion 45, provided on the opposite side of axis 43 relative to end portion 44, which is fitted with a tappet 46 for pushing shutter 20 against the action of spring 33.

Figure 4:
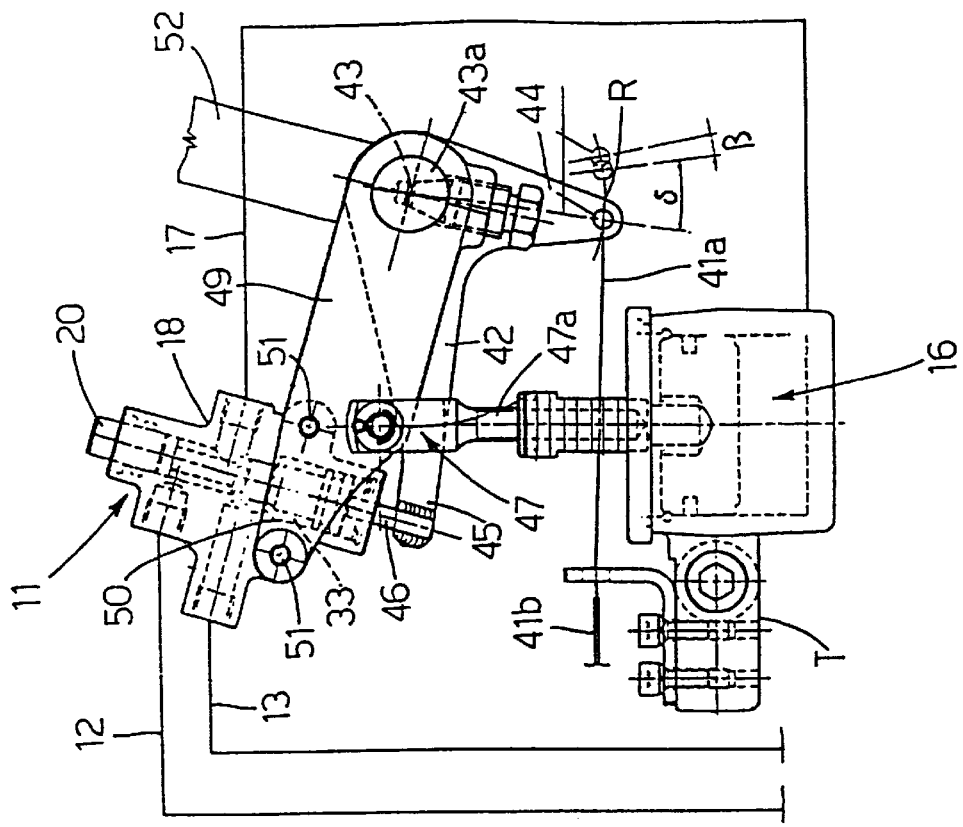
FIG. 4 shows a partly sectioned view of the FIG. 3 detail in a second operating position.
Figure 3:
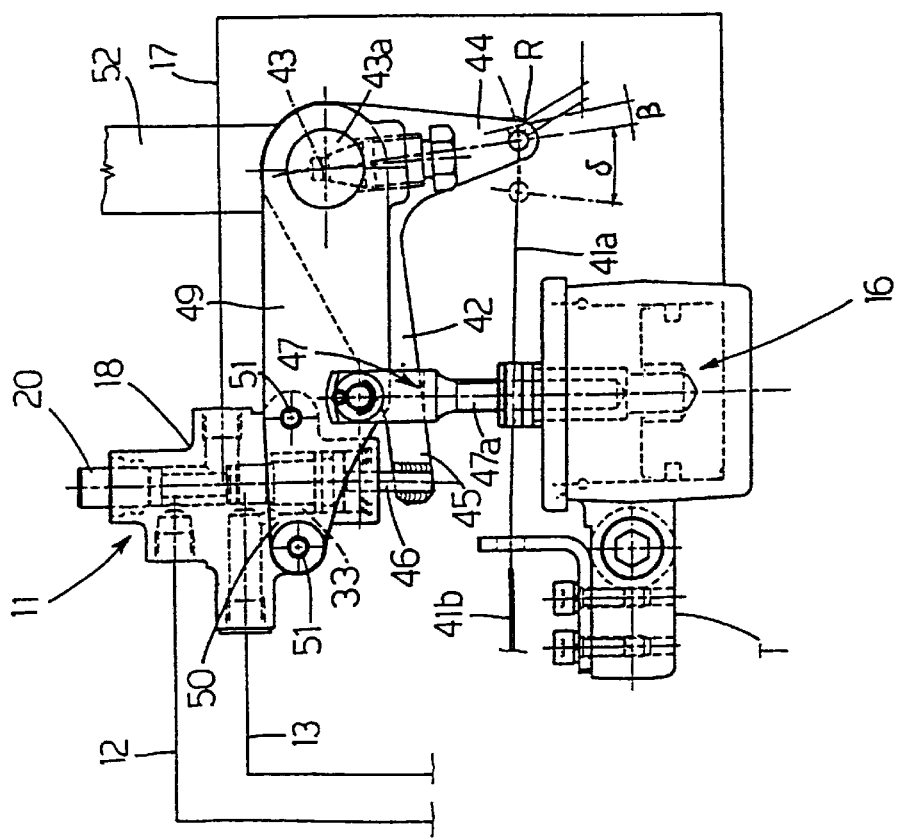
FIG. 3 shows a partly sectioned view of a second detail of the device according to the invention in a first operating position.

With reference to FIGS. 1, 3 and 4, cylinder 16 is fixedly connected to frame T and comprises a piston 47 movable between a withdrawn and an extracted position and in turn comprising a rod 47*a*, the free end of which is connected to a lever 49 so as to rotate about an axis 48 parallel to axis 43. Lever 49 rotates about axis 43 with respect to frame T and has an end portion 50 connected by two screws 51 to the body 18 of valve 11. The lever 49 is connected to a shaft 43*a* which actuates a lever 52 for acting on the clutch 2 in opposition to a spring 53 of said clutch 2.

Figure 5:
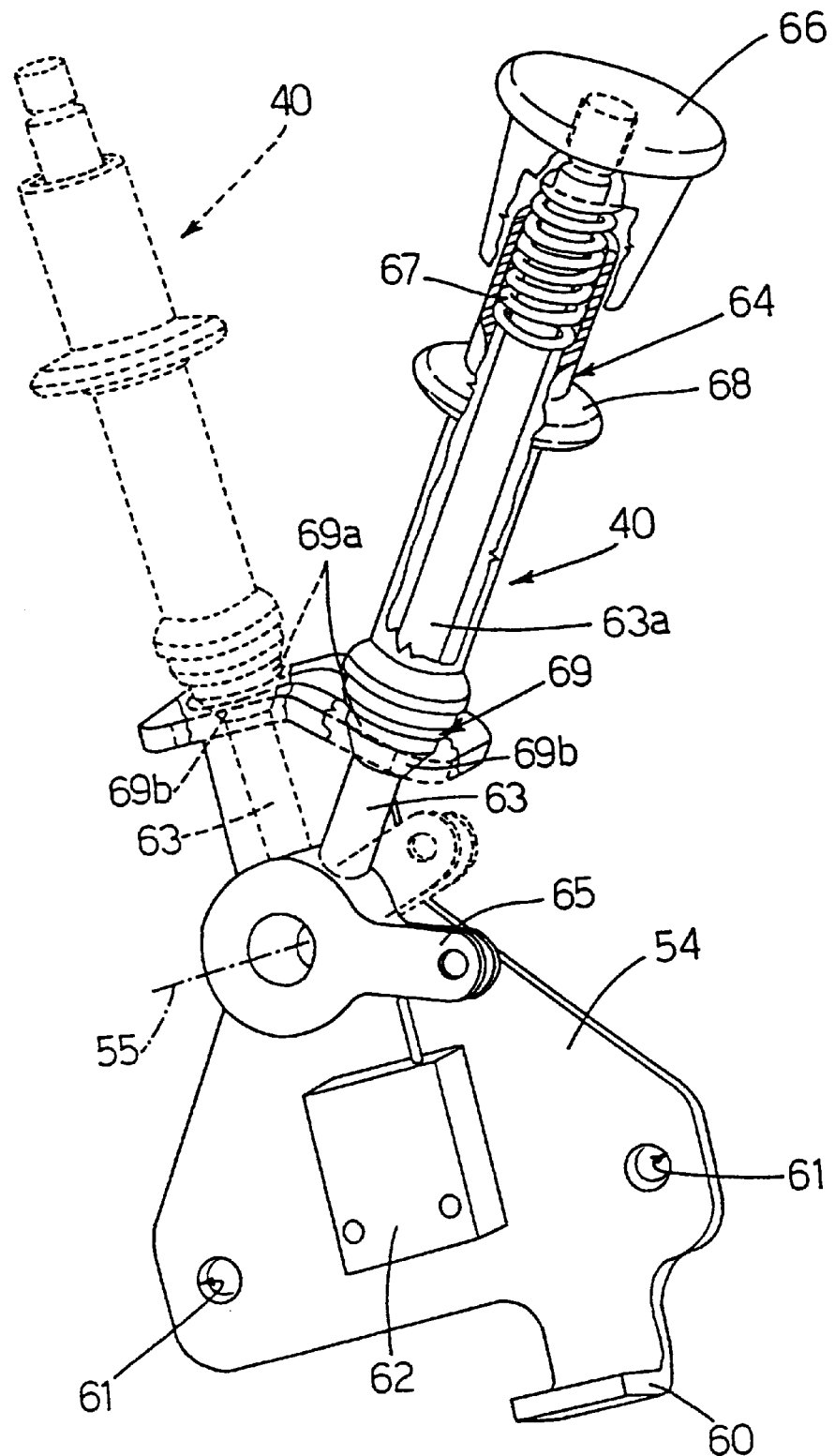
FIG. 5 shows a view in perspective of a further detail of the device according to the invention.
Figure 6:
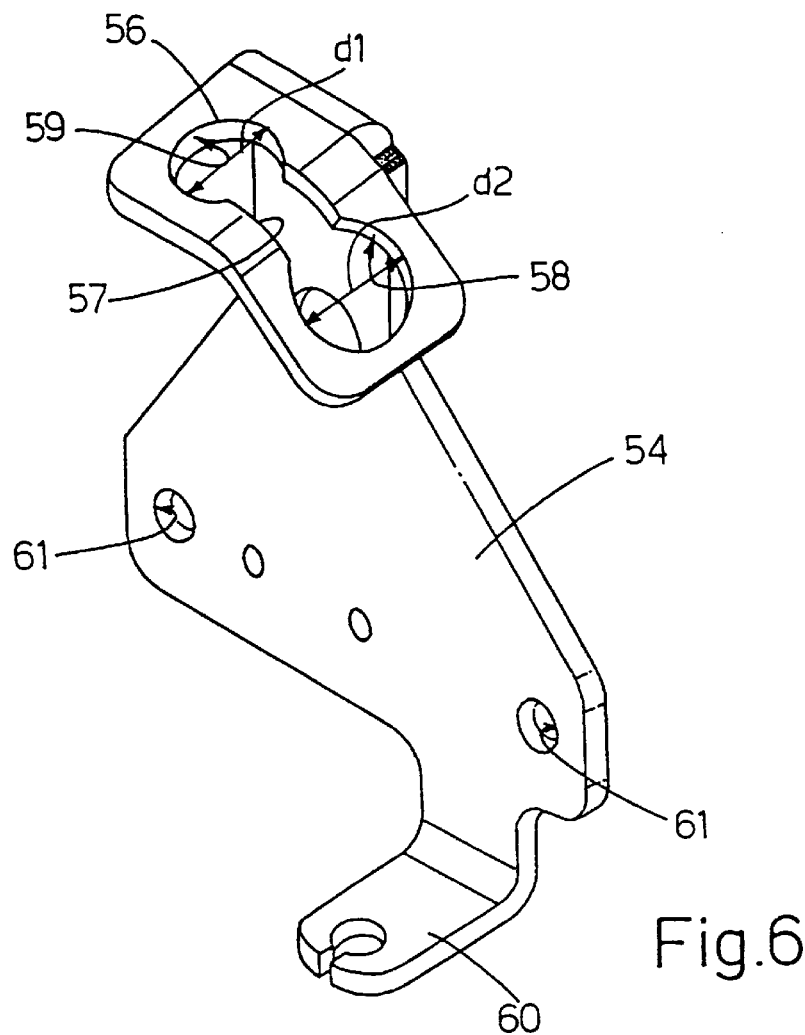
FIG. 6 shows a view in perspective of a detail of the FIG. 5 detail.

With reference to FIG. 5, in addition to lever 40, control member 5 also comprises a substantially flat plate 54 to which lever 40 is connected about an axis 55. As shown more clearly in FIG. 6, plate 54 is connected to a guide member 56 provided crosswise to plate 54 and having a slot 57 of constant width connecting two circular holes 58 and 59. Hole 58 corresponds to said rest position of lever 40 and has a given diameter d1 whereas hole 59 corresponds to said engaged position and has a diameter d2 smaller than diameter d1. Plate 54 also comprises an attachment member 60 for sheath 41*b*, apertures 61 for fastening plate 54 to frame T and a microswitch 62 for detecting the engaged position of lever 40.

Lever 40 comprises a rod 63 engaging slot 57 and having an end portion fitted for rotation about axis 55, and a portion 63*a* connected to a sleeve 64. At axis 55, lever 40 comprises a flange 65 for connection to cable 41*a*. Sleeve 64 is fitted coaxially about and slides with respect to rod portion 63*a*, and is held in position by a cap 66 fitted to the end of rod 63, and by a spring 67 located between cap 66 and sleeve 64, and which pushes sleeve 64 towards guide member 56.

Sleeve 64 comprises a control ring 68 located along sleeve 64 enabling the operator to grip and pull sleeve 64 in opposition to the action of spring 67. A lock element 69 located on the end of sleeve 64 facing guide 56 comprises a cylindrical portion 69*a* for engaging hole 58, and a truncated-cone-shaped portion 69*b* blending with cylindrical portion 69*a* for engaging hole 59.

Pressure limiting valve 14 along branch 15 comprises a conduit 70 defining a bypass of valve 14. In practice, conduit 70 is formed inside valve 14, and, as compared with branches 12, 13, 15 and 17 of circuit 4, has a relatively small section resulting in a relatively small amount of leakage which has no noticeable effect on the operation of device 1.

In actual use, device 1 is actuated by shifting lever 40 from the rest to the engaged position, after first raising sleeve 64 of lever 40 to extract lock element 69 from hole 58. When so shifted, lever 40 pulls on cable 41*a*, which in turn rotates lever 42 clockwise with reference to FIGS. 1, 3 and 4 to slide shutter 20 with respect to body 18. At a first stage, corresponding to a few degrees shift of lever 40, lever 42 and shutter 20 are set according to the FIG. 3 position in which lever 42 is rotated by an angle β with respect to an initial rest position indicated by reference point R in FIGS. 3 and 4. The displacement of shutter 20 opens valve 11 and connects supply branch 12 to connecting branch 17 of cylinder 16, which moves piston 47 to rotate lever 49 clockwise with reference to FIGS. 1, 3 and 4 by an angle β to thereby move body 18 with respect to shutter 20 to cut off the connection between supply branch 12 and connecting branch 17. Besides moving body 18, the rotation of lever 49 also moves lever 52, which acts on clutch 2 in opposition to the action of spring 53 and, as spring 53 is compressed, begins transmitting torque C from clutch 2 to PTO 3. As lever 40 is shifted further, shutter 20 again is moved with respect to body 18 to connect supply branch 12 to connecting branch 17 and, in so doing, move piston 47 further, so that, on the one hand, body 18 again is moved with respect to shutter 20 to cut off the connection between branches 12 and 17, and, on the other, lever 52 is further moved to increase the transmitted torque C. The above "tracking" sequence of body 18 with respect to shutter 20 is due to the hydraulic inertia of cylinder 16 and circuit 4 to adapt to the new position of shutter 20, and is repeated until piston 47 reaches the FIG. 4 limit position in which lever 52 keeps clutch 2 in such a position as to transmit the complete torque C to the PTO 3. In the FIG. 4 position, lever 42 has been rotated by an angle d with respect to the initial position and is set to a limit position in which shutter 20 is permanently positioned such as to connect branch 12 to connecting branch 17. In this condition, lever 40 is located in the engaged position in which the inclined portions of truncated-cone-shaped portion 69*a* of lock element 69 are positioned to contact the edge of the hole 59.

The maximum rotation of lever 49 equals angle d minus β and depends on the travel of piston 47, while the maximum travel of lever 42 equals angle d and depends on the design parameters of mechanical transmission 6 and the travel of lever 40. The difference in travel between levers 42 and 49 equals angle β, which corresponds to full travel of shutter 20 with respect to body 18, i.e. to the travel required to fully open and close valve 11.

Figure 7:
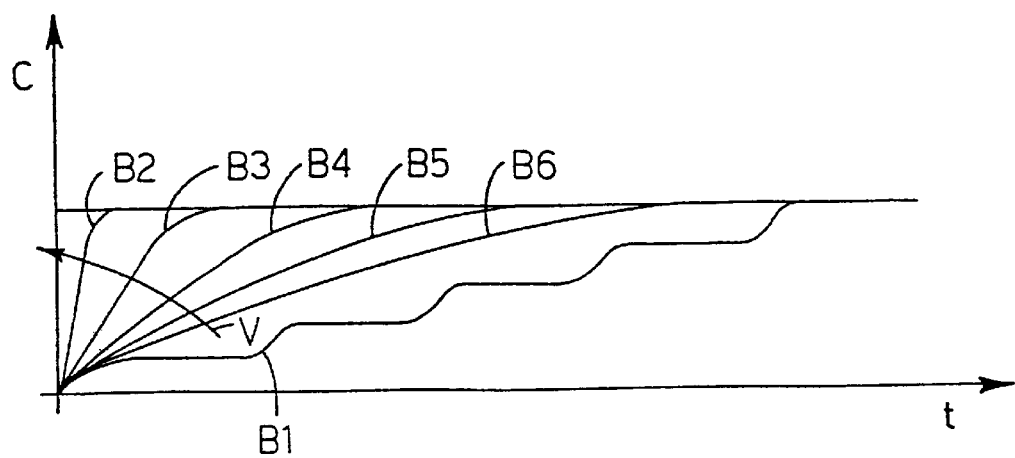
FIG. 7 shows a graph of a number of engagement stages effected by the device according to the invention.

The above operating description, provided by way of example, relates to a particular type of engagement of clutch 2, whereby lever 40 is incrementally moved between the two positions of FIG. 5, as shown by curve B1 in the FIG. 7 graph, in which the X axis represents the time scale, and the Y axis the percentage of torque C transmitted by clutch 2 to the PTO 3. Normally, clutch 2 is engaged by shifting lever 40 continuously between the FIG. 5 positions represented by curves B2 . . . B6 ranging between zero and maximum torque C and sloping differently according to the speed V at which lever 40 is shifted from the rest to the engaged position. A fast shift of lever 40 corresponds to a fairly steep slope, i.e. fast engagement of clutch 2, whereas a slow shift corresponds to a fairly gradual slope, i.e. slow engagement of clutch 2. This behavior is caused by the fact that to a fast shift of the lever 40 corresponds a rapid displacement of shutter 20, whereby, on account of the hydraulic delay of the hydraulic cylinder 16 to move into the new position, body 18 is unable to cut off or at least choke the connection between supply branch 12 and connecting branch 17. Said cutoff or choking effect of the connection between supply branch 12 and branch 17 becomes more noticeable as the speed V at which lever 40 is shifted is reduced.

To release clutch 2, lever 40 is restored to the initial position in which Bowden cable 41 rotates lever 42 anti-clockwise with referenced to FIGS. 1, 3 and 4, so that spring 33 restores shutter 20 to the position in which connecting branch 17 communicates with return branch 13, i.e. in which valve 11 is closed. At this stage, the force of spring 53 of clutch 2 is transmitted via lever 52 and lever 49 to piston 47, which, acting against the fluid in cylinder 16, drains cylinder 16 through branches 17 and 13. The rotation of levers 52 and 49, anti-clockwise in FIG. 1, also provides for resetting body 18.

When a farm vehicle (known in the art and not shown) is arrested with clutch 2 engaged, pump 10 is stopped and cuts off pressurized fluid supply to cylinder 16. In this condition, conduit 70 along branch 15 connects branches 12 and 17 to the tank 8 while the spring 53 of clutch 2 pushes on lever 52 and, in the absence of an opposing force by cylinder 16, initiates the rotation of levers 52 and 49 in the anti-clockwise direction with respect to FIG. 1 to drain the fluid from cylinder 16 through conduit 70.

At this stage, lever 49 rotates anti-clockwise in FIGS. 1, 3 and 4 by an angle of d minus β, simultaneously moving body 18, which in turn draws along shutter 20 so that lever 42 rotates anti-clockwise in FIGS. 1, 3 and 4 by an angle of d minus β, while the pressure of spring 33 on shutter 20 rotates lever 42 anti-clockwise in FIGS. 1, 3 and 4 by an angle equal to β.

Although the rotation of lever 42 is opposed by lever 40 locked in the engaged position, lever 42 nevertheless transmits a pulling force along cable 41 a to lever 40 to restore it into its initial position. Said pulling force provokes the release of element 69 from seat 59—made possible by the inclined walls of truncated-cone-shaped portion 69b of element 69—and the release of lever 40 enables levers 42 and 49 to return to the rest position. The pulling force between lever 42 and lever 40 is transmitted to rod 63 and from there to sleeve 64, the element 69 of which is positioned with truncated-cone-shaped portion 69b resting on the edge of hole 59. In other words, the above situation produces a succession of action-reaction forces between the elements defining control member 5—in particular, action-reaction forces between the inclined walls of truncated-cone-shaped portion 69b and the edge of hole 59—and, by virtue of the inclined walls of portion 69b, the action-reaction forces transmitted between element 69 and the edge of hole 59 comprise a force parallel to rod 63 which acts on and raises sleeve 64 in opposition to spring 67, whereby element 69 is released from hole 59 consequently releasing lever 40 which returns to the rest position. Element 69 and spring 67 are dimensioned such as to maintain the engaged position of lever 40 when cable 41a is only subjected to a pulling force by spring 33 of valve 11, and to release lever 40 when cable 41 a becomes subjected to a pulling force of spring 53 of the clutch 2.

Device 1 offers numerous advantages. In particular, on the one hand engagement of clutch 2 may be modulated by means of a manual control member 5 in the same way as a fully mechanical control device, while, on the other hand, relatively high torques can be controlled which are greater than those controllable by a fully mechanical device. Moreover, device 1 easily can be equipped with a safety device for releasing the clutch when the farm vehicle is stopped.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a mechanism for controlling a clutch having a hydraulic cylinder for controlling engagement and release of said clutch; a hydraulic circuit for supplying pressurized fluid to said hydraulic cylinder, said hydraulic circuit including a supply pump and a valve located between said supply pump and said hydraulic cylinder; and a control member connected to a first mechanical transmission to selectively operate said valve, the improvement comprising:

said valve being a tracking valve having a body and a shutter movable inside said body, said shutter being connected to said control member by said first mechanical transmission said body being movable as a function of a displacement produced by said hydraulic cylinder.

2. The mechanism of claim 1 wherein said hydraulic cylinder is connected to a second mechanical transmission for actuating said clutch, the body of said valve being connected to said second mechanical transmission.

3. The mechanism of claim 2 wherein said hydraulic cylinder includes a piston, said second mechanical transmission including a first lever, said piston being connected in a rotary manner to the first lever, and said body being fitted to said first lever.

4. The mechanism of claim 3 wherein said first mechanical transmission includes a second lever having a member contacting said shutter.

5. The mechanism of claim 4 wherein said first and second levers rotate about a first axis, the maximum travel of said first lever being less than the maximum travel of said second lever.

6. The mechanism of claim 5 wherein said second mechanical transmission further includes a third lever for controlling the clutch, said third lever being mounted for rotation about said first axis.

7. The mechanism of claim 6 wherein said control member includes a fourth lever rotating about a second axis between a rest position and an engaged position, said fourth lever being connected to said first mechanical transmission.

8. The mechanism of claim 7 wherein said control member further includes a guide member along which are formed a first seat and a second seat for locking said fourth lever.

9. The mechanism of claim 8 wherein said fourth lever includes a rod and a lock element movable selectively with respect to said rod and being engageable in the first and second seats.

10. The mechanism of claim 9 wherein said fourth lever further includes elastic means for pushing said lock element in the first and second seats, said first and second seat, respectively, having a first hole of a given first diameter, and a second hole of a given second diameter smaller than said first diameter, said lock element including a cylindrical first portion engageable in said first hole, and a truncated-cone-shaped second portion connected to said cylindrical first portion and being engageable in said second hole.

11. The mechanism of claim 10 wherein said clutch further includes a first spring for transmitting a first force to said lock element via said second mechanical transmission, said hydraulic cylinder and said first mechanical transmission; said valve including a second spring for transmitting a second force to said lock element via said mechanical transmission, the force exerted by said elastic means on the lock element being greater than said second force and smaller than said first force.

12. The mechanism of claim 11 wherein said hydraulic circuit further includes:

a first branch for supply along which a tank, said pump and said valve are located in succession;

a second branch connected to said first branch downstream of said pump; and a third branch located between said valve and said hydraulic cylinder; said second branch including a conduit having a relatively small section in comparison with said first and second branch to drain the hydraulic cylinder along said first, second and third branches when said pump is arrested.

13. The mechanism of claim 12 wherein said conduit defines a bypass of a pressure limiting valve located along said second branch, said conduit being located inside said pressure limiting valve.

* * * * *